(12) United States Patent
Spina et al.

(10) Patent No.: US 7,507,400 B2
(45) Date of Patent: Mar. 24, 2009

(54) WATER SOLUBLE DEPILATORY HAVING EXTENDED SHELF LIFE

(76) Inventors: Thomas N. Spina, 1925 Swarthmore Ave., Lakewood, NJ (US) 08701; Albert Maletsky, 795 Franklin Ave., Franklin Lakes, NJ (US) 07417

( * ) Notice: Subject to any disclaimer, the term of this patent is extended or adjusted under 35 U.S.C. 154(b) by 1564 days.

(21) Appl. No.: 10/178,814

(22) Filed: Jun. 24, 2002

(65) Prior Publication Data

US 2003/0004522 A1   Jan. 2, 2003

Related U.S. Application Data

(60) Provisional application No. 60/301,366, filed on Jun. 28, 2001.

(51) Int. Cl.
*A61K 8/19* (2006.01)
*A61K 8/00* (2006.01)
*A61K 51/00* (2006.01)

(52) U.S. Cl. ........................................................ 424/73
(58) Field of Classification Search .................. 424/73, 424/401, 70.11, 78.02
See application file for complete search history.

(56) References Cited

U.S. PATENT DOCUMENTS 2,326,609 A * 8/1943 Borglin ........................... 8/160
6,706,399 B1 * 3/2004 George et al. ................ 428/407

\* cited by examiner

*Primary Examiner*—Michael G Hartley
*Assistant Examiner*—Nabila G Ebrahim
(74) *Attorney, Agent, or Firm*—Clifford G. Frayne

(57) ABSTRACT

A depilatory for removal of body hair wherein a water soluble hot melt adhesive blend is coated onto a substrate and then cut and sized for use by the end user for the removal of body hair, the utilization of a water soluble or dispersable adhesive blend on the substrate allowing for the removal of any residue after the procedure with water.

6 Claims, 1 Drawing Sheet

WATER SOLUBLE DEPILATORY HAVING EXTENDED SHELF LIFE

RELATED APPLICATIONS

Applicant claims the benefit of provisional application 60/301,366, filed Jun. 28, 2001.

BACKGROUND OF THE INVENTION

1. Field of the Invention

The present invention relates to depilatories and in particular, to a depilatory utilizing water soluble adhesive blend which eliminates the need for removal of waxy residue by a solvent or the like.

2. Description of the Prior Art

Depilatories are well known in the art and have been used for many years, particularly by women, to remove body hair. Initially, a depilatory consisted of waxes blended with tackifying resins, simply termed "wax", which was melted and applied to the skin and allowed to set. It was stripped from the skin and in doing so, removed unwanted hair. This type of treatment can be obtained in a beauty salon or performed at home. "Waxes" utilized in a depilatory treatment were petroleum based waxes and resins typically rosin based. As such, after having stripped or removed, there remained on the skin a waxy, resinous residue. Since the composition inherently contained water insoluble ingredients, this residue also was not water soluble, and had to be removed from the skin with a suitable solvent such as baby oil or mineral oil which then necessitated rinsing the skin with water and soap or detergent.

Depilatories in sheet like form or strips have also been developed wherein the petroleum based wax/resin mixture is precoated on a substrate. The individual would purchase a package of such depilatories, the sheets containing the "wax" would then be applied to the skin and allowed to set and then stripped away and removed. This procedure suffers from the same problem as described previously where the "wax" is applied from a container directly to the skin. A waxy, resinous residue remains once the wax has been peeled away and this residue must be removed with an appropriate solvent such as baby oil or mineral oil which also necessitates rinsing with water and soap or detergent.

Sugar based "waxes" have been developed which can be applied to the skin from a container for the removal of body hair. These "waxes" are water soluble and therefore do not require a solvent for the removal of any residue, the residue being removable with water. However, the sugar based waxes are not suitable on sheets or strips for application in that they lack a sufficient viscosity, and lack sufficient thermal stability. Other water soluble waxes have been developed, but they too have not been compatible or suitable to coating onto a substrate for use in a sheet or strip type depilatory.

Applicant has developed a sheet or strip type depilatory utilizing a water soluble adhesive blend and the process for making same that allows for suitable shelf life for the product. The product can be maintained and not deteriorate over a wide temperature range and still performs the hair removal function. The ability to provide the user or individual with a sheet or strip depilatory with a water soluble adhesive blend allows the user to apply the depilatory for the removal of hair and subsequently remove the depilatory and wash away or shower away the residue which remains. The individual no longer is required to remove a residue with a suitable solvent such as baby oil or mineral oil and to then wash away or take a shower to remove the solvent. It also provides the individual with the convenience of a water soluble sheet or strip depilatory heretofore unavailable with sugar based "waxes".

Water solubility or dispersability of the hot melt adhesive is accomplished by the incorporation of appropriate hydrophilic raw materials which individually or in combination with other selected components, including surfactants, emulsifiers, waxes, resins, plasticizers and polymers provide the desired functionality.

Examples of water soluble or water dispersable polymers comprise polyvinyl alcohol (PVOH), polyvinyl pyrrolidone (PVP), vinyl pyrrolidone, vinyl acetate (PVP/VA), polyethyloxazoline (PEOX), branched sulfo-polyesters (Eastman AQ Branched Polyesters), manufactured by Eastman, and polyvinyl methyl ether.

Suitable waxes can include those such as ethoxylated montan wax (Hoechst wax KST), polyethylene glycol waxes, and ethoxylated alcohols (Unithox) manufactured by Baker Hughes.

Desirable plasticizers incorporated to improve water solubility and dispersibility and lower viscosity are liquid polyethylene glycols, polyethylene aryl ethers and monomeric plasticizers such as diethylene glycol dibenzoate (Benzoflex 2-45), dipropylene glycol dibenzoate (Benzoate 9-88), both manufactured by Velsicol Chemical Corp. Solid plasticizers such as dicyclohexyl phthalate and 1-4 cyclohexane dimethanol may be added to enhance, tack and raise the melting point of the adhesive to prevent cold flow under elevated temperature conditions. Surfactants and emulsifying agents are numerous and well known in the industry. Of those that we have discovered to be particularly useful are nonylphenol ethoxylated polyethylene glycol (Igepal 880) manufactured by Rhone-Poulenc and dioctyl ester of sodium sulfo-succinic acid (Aerosol OT-100) by Cytec.

Resins are employed to enhance tack and adhesion. Suitable resins that can be blended into the adhesive are rosins, disproportionated rosin soaps, hydroabietyl alcohol, polymerized rosin, rosin derivative and rosin derived dimeric acids.

OBJECTS OF THE INVENTION

An object of the present invention is to provide for a novel water soluble depilatory in sheet or strip like form which utilizes an adhesive blend as opposed to a petroleum based wax mixture.

Another object of the present invention is to provide for a novel water soluble depilatory in sheet or strip like form which utilizes an adhesive blend and allows for any residue remaining after the application of the depilatory to be easily removed with water.

A still further object of the present invention is to provide for a novel water soluble depilatory in sheet or strip like form in which the adhesive blend is coated onto a substrate for application.

A still further object of the present invention is to provide for a novel water soluble depilatory utilizing an adhesive blend which has an acceptable shelf life and does not degrade over a wide temperature range.

A still further object of the present invention is to provide for a novel water soluble depilatory utilizing an adhesive blend, the cohesive strength of the adhesive shall be such that the adhesive transfers evenly to both surfaces when two substrates are peeled apart.

SUMMARY OF THE INVENTION

A depilatory for removal of body hair wherein a water soluble adhesive blend is coated onto a substrate and then cut and sized for use by the end user for the removal of body hair, the utilization of a water soluble adhesive blend on the substrate allowing for the removal of any residue after the procedure with water.

BRIEF DESCRIPTION OF THE DRAWINGS

These and other objects of the present invention will become apparent, particularly when taken in light of the following illustrations wherein.

DETAILED DESCRIPTION OF THE DRAWINGS

Figure 1:
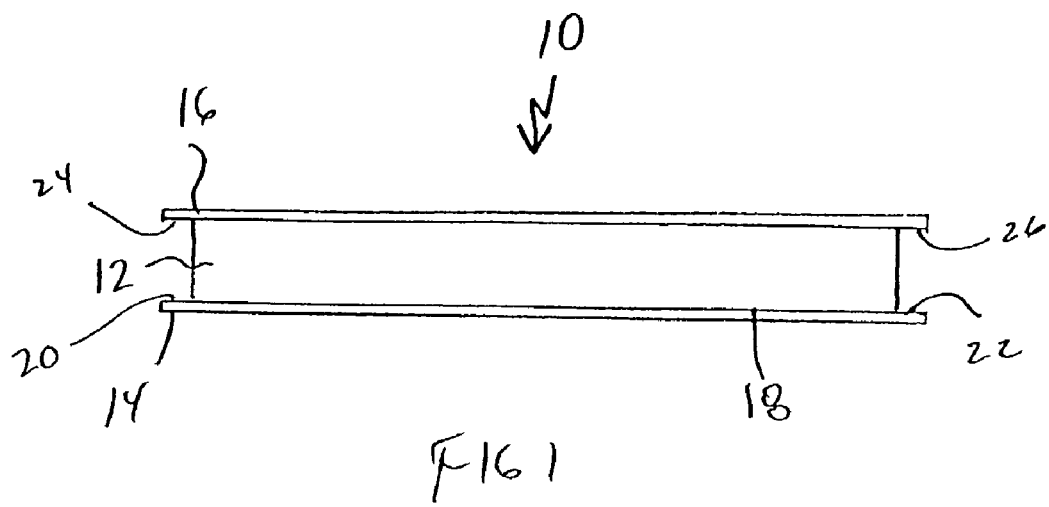
FIG. 1 is a cross-sectional view of the depilatory identifying the multiple layers thereof.

FIG. 1 is a cross sectional view (not to scale) of a depilatory of a sheet or strip depilatory 10 identifying the multiple layers associated therewith utilizing an adhesive blend for the removal of body hair.

Sheet or strip depilatories 10 come in a variety of sizes depending upon the area of the body to which it is to be applied. For the leg, the sheet or strip depilatory is normally sold in 4 inch by 8 inch strips. Sheet or strip depilatories 10 for the bikini region may be in the range of 3 inches by 7 inches and those depilatories 10 utilized for facial hair, in particular the upper lip, may be sold in narrow strips of ½ inch by 2 inches. Regardless of the size of the depilatory 10, it can be formed in accordance with the teachings of applicant.

In the cross section illustrated in FIG. 1, adhesive blend 12 is melted and coated onto a first substrate 14 and is then overlaid with a second substrate 16. This process is accomplished by providing for a continuous roll of first substrate 14 which passes through a coating station in which the adhesive blend 12 is coated onto first side 18 of first substrate 12 and thereafter, a continuous roll of second substrate 16 is overlaid the adhesive blend 12. Thereafter, the continuous roll of adhesive blend 12, first substrate 14 and second substrate 16 may be cut to the desired lengths. The width of first substrate 14 and second substrate 16 and the width of the coating station applying adhesive blend 16 may vary depending upon the width of the depilatory 10 which is desired.

In forming depilatory 10, the application of the adhesive blend 12 to first substrate 14 provides for an uncoated longitudinal edge 20 and an uncoated longitudinal edge 22 on first substrate 14. Second substrate 16 is overlaid adhesive blend 12 such that it also has uncoated longitudinal edges 24 and 26. Uncoated edges 20, 22 and 24, 26 allow the user to be able to grasp the corresponding edge of first substrate 14 and second substrate 16 of the end product in order to separate the depilatory 10 for application of the adhesive blend 12 to the skin.

Figure 2:
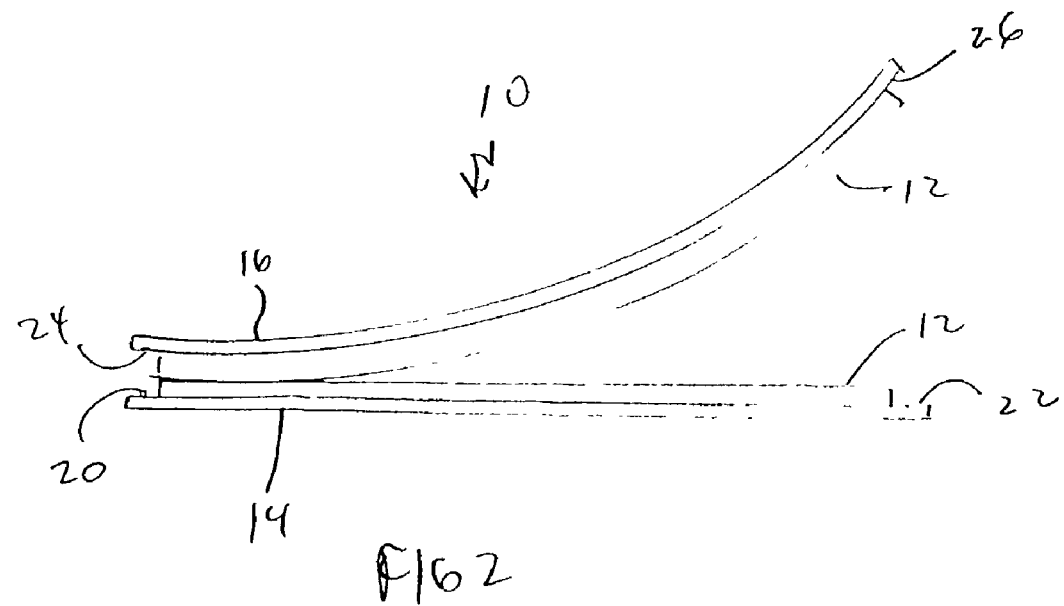
FIG. 2 is a side view of the depilatory of the present invention.

In applying the depilatory 10, the user grasps an uncoated edge 20 or 22 of first substrate 14 and the similar uncoated edge 24 or 26 of substrate 16 and separates depilatory 10. As illustrated in FIG. 2, the user is presented with two depilatories 10 for application in that adhesive blend 12 will separate and maintain a coating of the first substrate 14 and second substrate 16 will separate with a coating of adhesive blend 12 as a result of the weak cohesive integrity of the adhesive so that it "splits" evenly on both substrates.

Substrates 14 and 16 may be formed of a suitable polymer such as polypropelene, or a suitable cellulosic material.

A suitable depilatory of the present invention can be obtained with the following constituents; a resin present in a range of from 5 to 40 percent; a liquid plasticizer present in a range of from 5 to 40 percent; a solid plasticizer present in a range of from 5 to 40 percent; a water soluble dispersable wax present in the range of from 5 to 40 percent; and a water soluble or dispersable polymer present in a range of from 5 to 80 percent. There are additional trace constituents comprising anti-oxidants present in a range of less than one percent.

In the preferred embodiment the foregoing constituents would be present in the following percentages: hydrogenated rosin 9.5 percent; di-propylene glycol dibenzoate 27 percent; 1,4-cyclohexane dimethanol dibenzoate 5 percent; ethoxolated alcohol 12.5 percent; sulfo-polyester 36.5 percent; poly(vinyl) pyrrolidone vinyl acetate 8.5 percent; and anti-oxidants 1 percent.

While the present invention has been described with respect to the exemplary embodiment thereof, it will be recognized by those of ordinary skill in the art that many changes and modifications can be made without departing from the spirit and scope of the invention. It is therefore manifestly intended that the subject matter be limited only by the claims and the equivalents thereof.

We claim:

1. A depilatory for removal of body hair comprising:
a water soluble, water dispersible hot melt adhesive blend coated on a first substrate and overlaid with a second substrate in a continuous fashion and cut to size dependent upon the area of the body to which it is applied, separation of said first and second substrate resulting in a first substrate having a water soluble, water dispersible hot melt adhesive blend on one side and a second substrate having a water soluble, water dispersible hot melt adhesive blend on one side, allowing application of the application of said water soluble, water dispersible hot melt adhesive blend on said first substrate and said second substrate to a portion of a user's skin, removal of said first substrate and said second substrate containing said water soluble, water dispersible hot melt adhesive blend from said user's skin removes body hair and any residue of said water soluble, water dispersible hot melt adhesive blend remaining on said user's skin is removable with water.

2. The depilatory in accordance with claim 1 wherein said first substrate and said second substrate are formed from a polymer such as polypropylene or other suitable plastic film.

3. The depilatory in accordance with claim 1 wherein said first substrate and said second substrate are formed from a cellulosic material.

4. The depilatory in accordance with claim 1 wherein said water soluble adhesive is comprised of hydrogenated rosin, di-propylene glycol dibenzoate, 1,4-cyclohexane di-methanol di-benzoate, ethoxylawted alcohol, a water soluble or disbursable sulfo-polyester, poly(vinyl) pyrrolidone acetate and anti-oxidants.

5. The depilatory in accordance with claim 4 wherein said hydrogenated rosin is present in a range of from 5 to 40 percent, said di-propylene glycol benzoate is present in a range of from 5 to 40 percent, said 1, 4-cyclohexane di-methanol di-benzoate is present in the range of from 5 to 40 percent, said ethoxylated alcohol is present in a range of from 5 to 40 percent, said sulfo-polyester is present in a range of from 5 to 80 percent, said poly(vinyl) pyrrolidone vinyl acetate is present in a range of from 5 to 40 percent, and said anti-oxidants are present in the range of less than 1 percent.

6. The depilatory in accordance with claim 5 wherein the preferred water soluble adhesive is comprised of hydrogenated rosin in the percentage amount of 9.5 percent; di-propylene glycol benzoate in the percentage amount of 27 percent, di-methanol 1,4-cyclohexane di-benzoate in the percentage amount of 5 percent, ethoxylated alcohol in the percentage amount of 12.5 percent, water soluble sulfo-polyester in the percentage amount of 36.50 percent, poly(vinyl) pyrrolidone vinyl acetate in the percentage amount of 8.5 percent, and anti-oxidants in the percentage amount of 1 percent.

* * * * *